Figure 1:
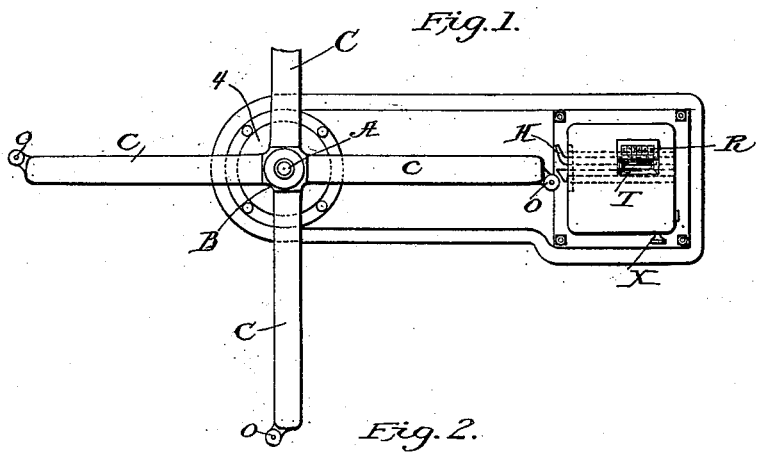

(No Model.)  5 Sheets—Sheet 1.

O. H. WILLIAMS.
COIN CONTROLLED TURNSTILE GATE.

No. 529,006.  Patented Nov. 13, 1894.

Witnesses.  Inventor.

(No Model.) 5 Sheets—Sheet 2.
O. H. WILLIAMS.
COIN CONTROLLED TURNSTILE GATE.
No. 529,006. Patented Nov. 13, 1894.
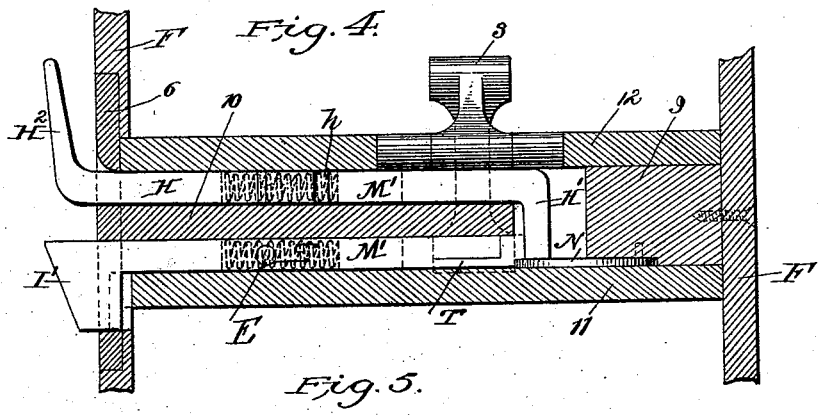
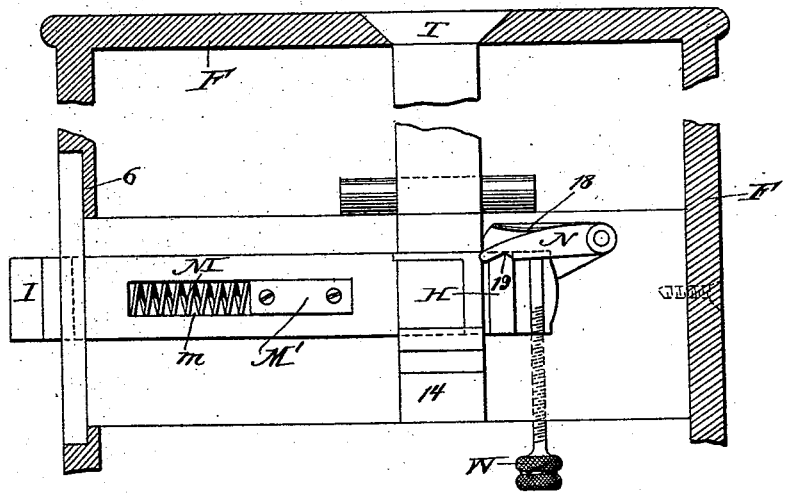
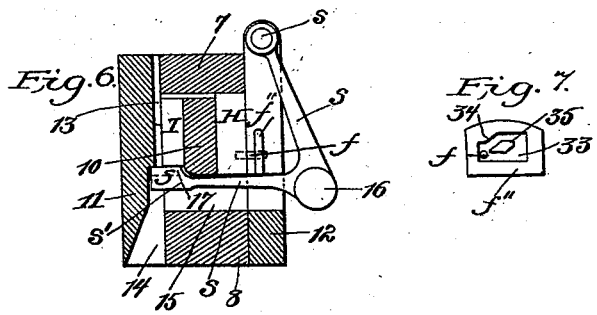 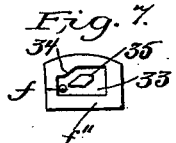
Witnesses.
Wm. W. Rheem.
Jno. L. Coudron
Inventor.
Orion H. Williams
By, Raymond & Onohundro
Attys.

(No Model.)

O. H. WILLIAMS.
COIN CONTROLLED TURNSTILE GATE.

No. 529,006.

5 Sheets—Sheet 3.

Patented Nov. 13, 1894.

Fig. 9.

Fig. 8.

Witnesses:
Wm. M. Rheem
Jno. L. Condon

Inventor:
Onion H. Williams
By Raymond & Onohuyses
Attorneys (No Model.) 5 Sheets—Sheet 4.
O. H. WILLIAMS.
COIN CONTROLLED TURNSTILE GATE.
No. 529,006. Patented Nov. 13, 1894.
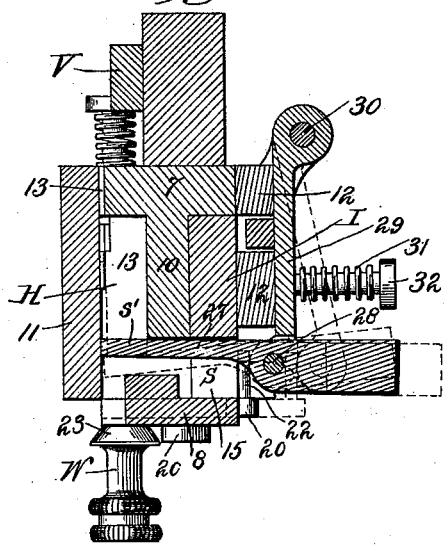
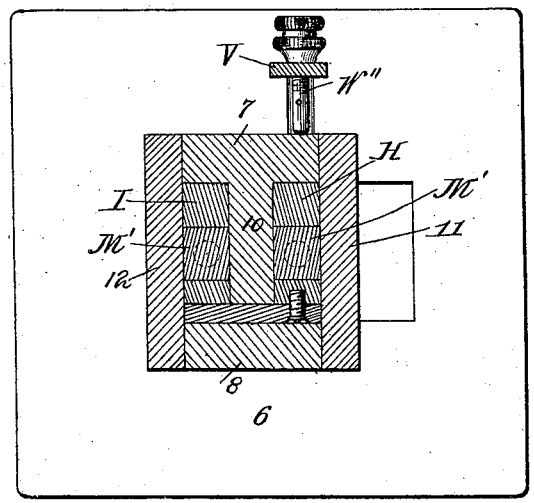
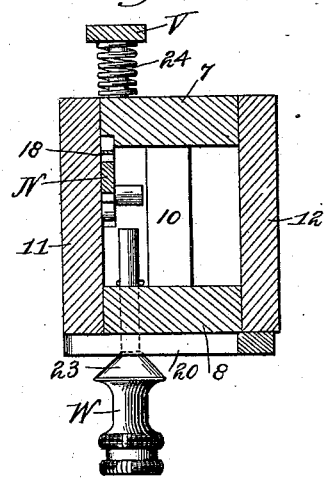
Witnesses:
Inventor:

(No Model.) 5 Sheets—Sheet 5.
O. H. WILLIAMS.
COIN CONTROLLED TURNSTILE GATE.
No. 529,006. Patented Nov. 13, 1894.
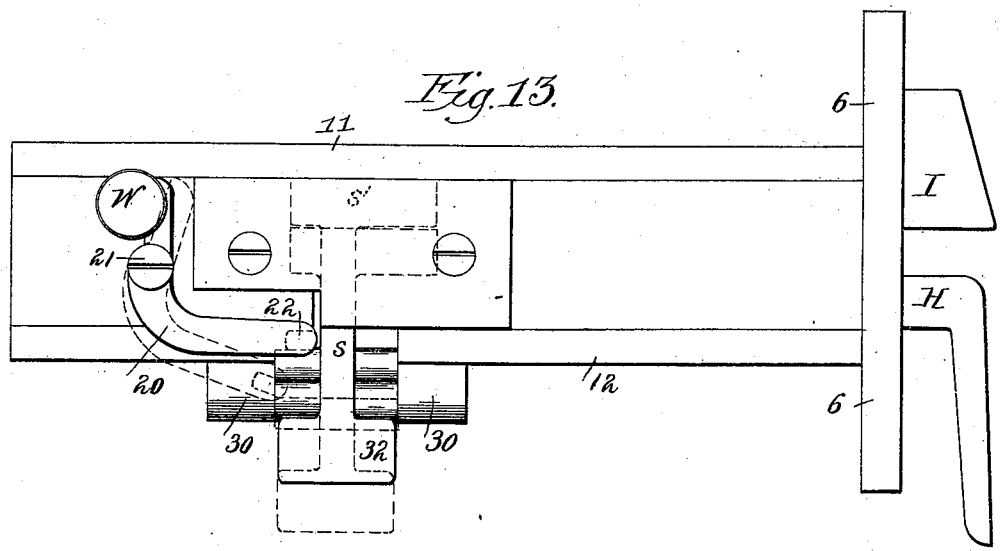
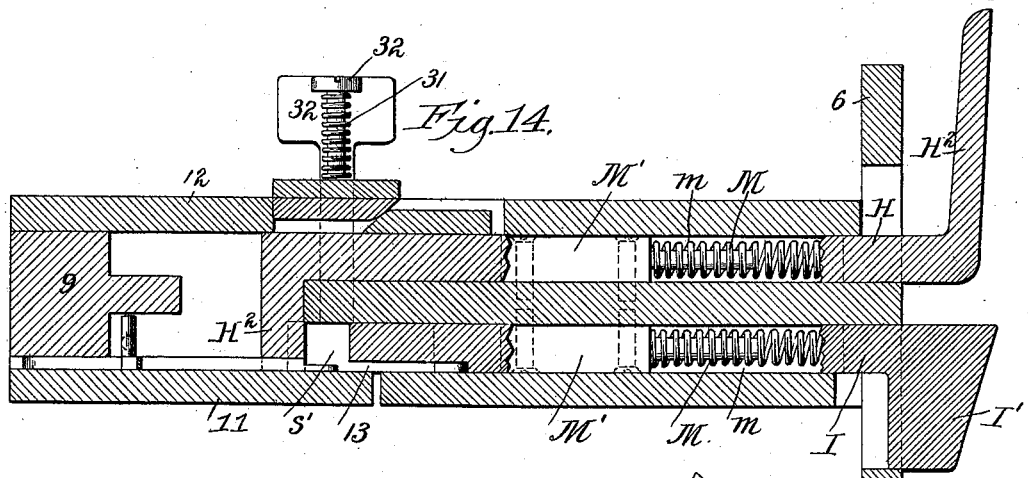
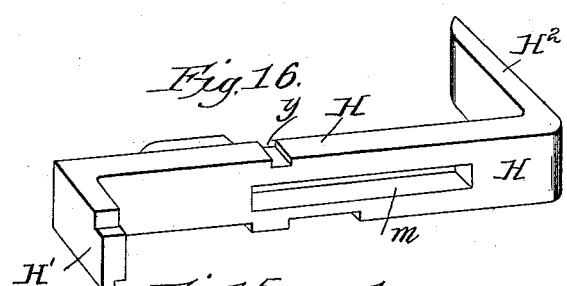

UNITED STATES PATENT OFFICE.

ORION H. WILLIAMS, OF CHICAGO, ILLINOIS, ASSIGNOR TO THE CASPER AUTOMATIC PATENT COMPANY, LIMITED, OF NEW ORLEANS, LOUISIANA.

COIN-CONTROLLED TURNSTILE-GATE.

SPECIFICATION forming part of Letters Patent No. 529,006, dated November 13, 1894.

Application filed September 1, 1893. Serial No. 484,590. (No model.)

*To all whom it may concern:*

Be it known that I, ORION H. WILLIAMS, a citizen of the United States, residing at Chicago, in the county of Cook and State of Illinois, have invented certain new and useful Improvements in Automatic Turnstile-Gates, of which the following is a full, clear, and exact description, reference being had to the accompanying drawings, forming a part of this specification.

My invention relates to revolving turnstiles or gates which are designed to permit the passage of persons, singly or in succession through an entrance or passageway where coins, tickets, or fares of any kind are collected from the persons desiring to enter.

Among the primary objects of my invention is included that of producing a turnstile-gate which may be operated either voluntarily by a duly authorized attendant, or automatically after the person desiring entrance shall have properly deposited the required coin, ticket or other fare.

A further primary object of my invention is to produce a turnstile-gate in which the direction of rotation of the gate itself shall be fixed or determined in such manner as to prevent all reversed or improper rotation thereof, and also to insure the effective locking of the gate against any rotation whatever, so as to effectually close the passageway, until a coin, ticket or other prescribed fare shall have been duly deposited, or until the gate shall have been released by an authorized attendant.

A still further primary object of my invention is to produce a turnstile-gate the locking-mechanism of which can be readily manipulated by a duly authorized person or an attendant so as to be controlled either by the hand or foot of such person independently of the deposit of any coin, ticket or fare and which shall be proof against mischievous tampering by unauthorized persons.

To the above purposes, as also to such others as may appear from the ensuing description, my invention consists in certain peculiar and novel features of construction and arrangement, as hereinafter described and claimed.

The more precise nature of my invention will be better understood when described with reference to the accompanying drawings, in which—

Figures 2, 3:
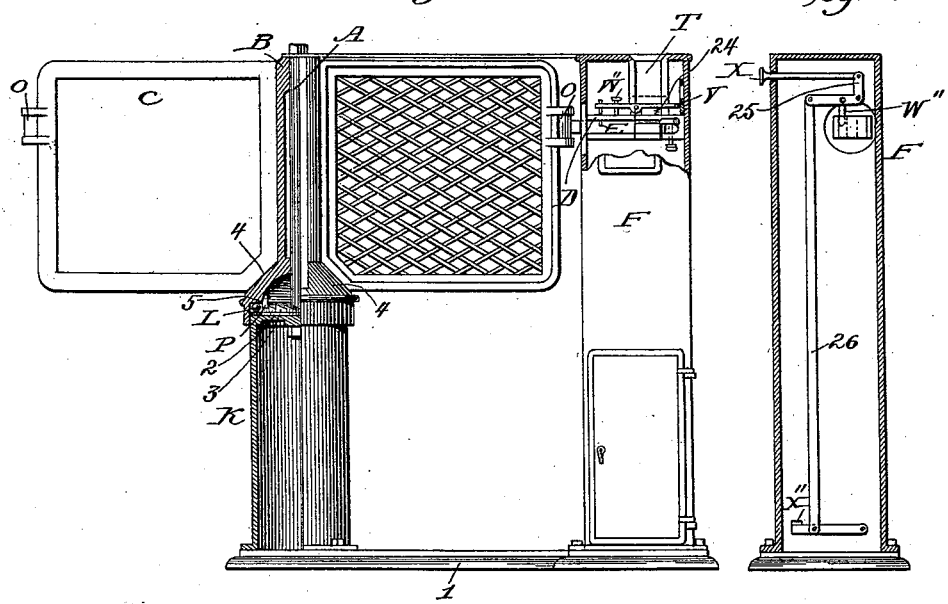

Figure 1 is a plan view of a turnstile-gate embodying my invention. Fig. 2 is a view of the same, partly in front elevation, partly broken away and partly in transverse vertical section. Fig. 3 is a transverse vertical section of the post or standard-casing for the locking-mechanism. Fig. 4 is an enlarged horizontal section of the casing for the locking-bolts, showing the bolts and certain of their immediate connections. Fig. 5 is an enlarged transverse vertical section of the upper part of the locking-mechanism post, or standard-casing showing the locking-mechanism therein; the side-plates of the lock being removed from the exposed side of the same. Fig. 6 is a transverse vertical section of the locking-bolts and their casing; showing the scale-beam lever in its normal or locked position. Fig. 7 is a detached view, in outer side elevation of the cam for the scale-beam lever and of the pin operating therewith. Fig. 8 is an enlarged plan view of the lock and its casing detached from the standard-casing or post for said lock. Fig. 9 is a side elevation of the same, the side-plate being removed from the exposed side of the lock-casing. Fig. 10 is a transverse vertical section of the lock, taken on the plane indicated by the line 10—10 of Fig. 9; the direction of view being that indicated by the arrows applied to the section-line. Fig. 11 is a transverse vertical section of the lock, taken on the plane indicated by the line 11—11 of Fig. 9, the direction of view being that indicated by the arrows applied to the section-line. Fig. 12 is a transverse vertical section of the lock, taken on the plane indicated by the line 12—12 of Fig. 9, the direction of view being that indicated by the arrows applied to the section-line. Fig. 13 is an under side plan view of the lock, detached from its containing-post. Fig. 14 is a horizontal section of the lock, taken on the plane indicated by the line 14—14 of Fig. 9, the direction of view being downward as indicated by the arrows applied to the section-line. Fig. 15 is a detached perspective view of the primary locking-bolt. Fig. 16 is a detached perspective view of the secondary locking-bolt.

In describing the structure illustrated, as embodying my invention, I will first describe the gate itself and its immediate attachments, and will then describe the locking-mechanism and its attachments.

In the said drawings, K designates the post or standard casing of the gate proper, this post or casing being of metal and hollow and bolted or otherwise secured at its lower end to a horizontal base-piece or sill 1, so as to rise vertically from the latter. The upper end of this post or standard K is formed or otherwise suitably provided with an internal horizontal partition 2 which carries on its upper surface a circular series of ratchet-teeth 3; the diameter of this ratchet-ring being somewhat less than that of the post in order to permit a number of anti-friction balls L (the purpose of which will be presently explained) to roll upon the upper surface of the partition 2 outside of the ratchet-ring 3. To the center of the partition 2 is bolted, or otherwise suitably secured, a spindle A which rises vertically from the partition. This spindle is surrounded by a hollow vertical hub or shaft B the upper end of which closely embraces the upper end of the spindle A, so as to turn thereon, and the lower end 4 of which is flared outwardly and downwardly into approximately bell-shape, as shown, so as to embrace the upper end of the post K, closely but in such manner as to turn freely upon said post. The lower margin of the hub B is formed with an internal annular shoulder 5 which rests directly upon the anti-friction balls L and thus affords a practically frictionless support for the hub, upon the post. To the inner surface of the lower end 4 of the hub B is pivoted a pawl P which engages the ratchet-teeth 3, in such manner as to permit the pawl to ride freely in one direction over the ratchet-teeth, when the hub B is turned in one direction, but to instantly engage one or another of said ratchet-teeth, when it is attempted to turn the hub in the reverse direction; this engagement instantly preventing such reversed rotation of the hub.

From the sides of the hub B extend radially outward a suitable number of arms C which serve as bars, to close and open the passageway as the hub B is rotated; these arms or bars being either rectangular skeleton frames carrying lattice-work, as shown, or of any other suitable structural character. As shown, there are four of the arms or bars C and in such event the ratchet-ring preferably contains forty ratchet-teeth, so that during each quarter of a complete revolution of the hub B, one of the arms or bars C shall move out of position across the passageway and open the same and the next arm or bar shall move into position across said passageway and close the same; the pawl P meanwhile riding over ten teeth 3 and then stopping in engagement with one of the teeth.

It is to be understood that there may be more than one pawl P, if preferred, and that the precise number of arms or bars C and ratchet-teeth 3 may be varied, if desired, so long as the successive opening and closing of the passageway and locking of the hub against reverse rotation is insured. At its outer end, each arm or bar C is preferably provided with a roller O which operates by contact with the bolts of the locking-mechanism, as hereinafter explained.

It will be seen, from the above description, that the gate is capable of turning with but little friction and that its anti-friction mechanism is wholly concealed so as to be effectively protected from injury by the weather or other external causes. It will also be seen that the pawl P is likewise protected from injury and that it is not accessible and is consequently not liable to be tampered with by unauthorized persons.

I will now proceed to describe the locking mechanism which I have shown, for retaining the gate in stationary condition until it is released either voluntarily by a duly authorized attendant or by a coin deposited by the person desiring admittance. This locking mechanism is mounted principally within the upper end of a hollow post or standard F, the lower end of which is bolted or otherwise suitably secured to the base or sill 1 so that said post shall extend vertically upward from the sill.

The locking-mechanism includes two longitudinally movable bolts H and I which are placed horizontally, the one beside the other, and which are arranged to move horizontally in a guiding frame-work. This framework consists of a vertical face-plate 6, an upper horizontal guide-plate 7 and a lower horizontal guide-plate 8 both extending inward from the face-plate 6 and connected together at their inner ends by a back-plate 9. The face-plate 6 is located at that side of the post F which is adjacent to the outer end of a bar or arm C of the gate, when such bar or arm is in position to close the passageway, and from said face-plate also extends inward a partition 10 which is interposed between the two bolts H and I. The front side of the frame is covered by a plate 11 which is preferably connected by suitable screws to the top plate 7 and bottom plate 8, while the opposite or rear side of the frame is covered by a plate 12 which is preferably similarly secured to said top and bottom plates.

The primary locking-bolt I is of somewhat less strength than the secondary locking-bolt H and has a straight body-portion carrying at its outer end a laterally extending head I' the face of which is inclined outwardly and rearwardly, as shown, so that the rollers O of the gate-arms C can ride upon said inclined face and force the bolt inward. The inner end of the secondary bolt H is provided with a lateral extension H' which lies across the path of movement of the inner end of the bolt I, so as to be struck by said end of the bolt I when the latter is forced inward and the outer end of the bolt H is provided with a rearwardly and outwardly inclined lateral extension H² to be struck by the rollers O as the gate arms C are moved to admit the person or persons.

The bolts H and I are each provided with a spring M, located within a longitudinal slot $m$ which is formed in the bolt, and pressing at one end against the outer end of the slot and at its opposite end against the corresponding side of the adjacent one of two studs M' projecting oppositely from the partition 10; these studs projecting into the slots $m$, and the tendency of said springs M being to throw the bolts H and I outward or forward.

The inner surface of the side-plate 11, of the bolt-frame, is grooved vertically, so as to form a passageway 13 for the coin or ticket; this passageway communicating at its upper end with the lower end of a chute T, and at its lower end indirectly with a passageway 14 which is formed through the bottom plate 8 and communicates with a suitable receptacle (not shown) for the coins or tickets. The chute T leads upward from the passageway 13 and opens at its upper end at the top of the post F; the intention being that the coins or tickets shall be successively deposited in the chute T and, descending therethrough, enter the passageway 13, for a purpose to be hereinafter explained.

S designates a coin-actuated trip-arm which is pivoted upon one side of the lock-frame and which extends transversely of the lower part of the lock-frame, adjacent to the passageway 13; this arm normally occupying such a position as to intercept a coin within the passageway, and also to prevent any retractive movement of the bolts H and I, As shown in the drawings, the trip-arm S is of approximately V-shape and is pivoted, as at $s$, at its upper end, upon the upper margin of the side-plate 12 of the lock-frame. The lower arm of this trip extends into a transverse recess 15 in the bottom-plate 8 of the lock-frame and the angle of union of the upper and lower arms of the trip is weighted or enlarged, as at 16, so as to hold the lower arm normally within a recess 17 in the under edge of the bolt I. The inner end of the trip-arm S is preferably enlarged somewhat, laterally, so as to form a head $s'$ which normally extends across the lower end of the passageway 13 so as to intercept the coin.

N designates a catch-arm which is pivoted at its rear end to that side of the back-plate 9 of the lock-frame against which rests the side-plate 11 of said frame and which is pressed downwardly by a suitable spring, such, for example, as the leaf-spring 18, shown. The front or free end of the catch-arm N is held normally in contact with the inner or rear end of the bolt I and is notched as at 19 to engage the bent inner end H' of the bolt H. The free end of the arm N also projects into the passageway 13 so as to come at times into contact with the coin within said passageway, as hereinafter also explained.

The operation of the mechanism thus far described is as follows: Ordinarily the roller O of one of the gate-arms C stands in contact with the outer or front side of the primary bolt I, and the pawl P holds the arm against backward rotation, while the bolt I holds the arm against forward rotation; the coin-actuated trip-arm S preventing the bolt I from moving inward so as to allow the arm C to swing past said bolt. A person desiring to enter the gate drops a coin of the required denomination into the chute T and the falling coin strikes upon and depresses the lower arm of the trip-arm S so as to move said arm out of engagement with the rear or inner end of the primary bolt I. Forward movement of the gate-arm C (either by the person entering the gate, or by an attendant) causes the roller O to push the primary bolt I inward and this inward movement of the bolt presses the coin, in the passageway 13, rearward beneath the trip-arm N. The coin thus raises the trip-arm out of engagement with the lateral extension H' of the secondary bolt H and the continued inward or rearward movement of the primary bolt I causes the coin to drop through the passage 14 which is rearward from the passage 13, and into the receptacle (not shown) and also causes the inner end of the primary bolt I to strike the lateral extension H' of the secondary bolt H and to thus retract the latter bolt. The arm C of the gate is now free to swing past the end H² of the secondary bolt H, and immediately thereafter the springs M throw the bolts H and I outward; the trip-arm S rising and locking the bolt I and the catch N dropping and locking the bolt H. Thus when the next arm C of the gate swings into closed position, it is held against further movement by the engagement of its roller O, with the primary bolt I until a second coin is deposited.

It is frequently desirable to open the gate without any deposit of a coin as above described, as, for instance, when a person presents a pass entitling him to free admission, and in such event it is desirable that the gate can be operated by an attendant. To provide for such contingencies I provide the attachments which I will now proceed to describe. It is necessary, first, to throw the trip-arm S out of contact with the bolts H and I in order that the bolts may be retracted by the gate arm, and for this purpose, I pivot upon the under side of the bottom-plate 8 of the lock-frame a dog 20, the pivot of which is shown at 21; the dog being of approximately J-form and having at the end of its longer arm an upwardly extending stud 22 which engages the inner surface of the vertical arm of the trip-arm S. Extending upwardly through the bottom-plate 8 of the lock-frame is a screw-rod W which is threaded through said bottom-plate 8 and the lower end of which is formed with a milled head or with any other equivalent attachment which will facilitate the required manipulation of the screw by an attendant. Just above this milled head, the screw W is shown in Figs. 9, 10 and 12 provided with a conical enlargement 23 which comes into contact with the shorter arm of the dog 20. The arrangement is such that when the screw-rod W is turned axially so as to raise the screw, the inclined sides of the conical enlargement 23 engage and force the shorter arm of the dog 20 forward and thus move the longer arm of said dog outward; the longer arm of the dog acting by its stud 21 to move the upper arm of the trip S outward and consequently to depress the lower arm of said trip out of engagement with the inner end of the bolt I. Thus the bolt I is left free to be retracted.

It is also necessary to free the lateral extension H' of the bolt H from engagement with the catch-arm N and for this purpose the screw-rod W is of such length as shown in Fig. 5 that when it is screwed upward, as just described, its upper end shall come into contact with the under side of the trip-arm and elevate said arm, against the action of its spring 18, out of contact with the extension H' of the bolt H. Thus the bolt H is free also to be retracted, by contact of the inner end of the bolt I with the extension H' of the bolt H.

As a further means of locking the bolt I, a lever V is pivoted midway of its length upon the top-plate 7 of the bolt-frame, and is provided at its front end with a pendent pin D which passes through the top plate and into a socket E formed in the upper edge of the bolt I. The pin D is held normally within the socket E by a spring 24 which is interposed between the under side of the rear end of the lever V and the adjacent portion of the top-plate 7; said spring serving to hold the rear end of the lever V elevated and its front end depressed. A pull-rod X (designed to be operated by hand) is connected at its inner end to the upper end of a bell crank 25 the lower arm of which is connected to the rear end of the lever V as shown in Fig. 9. A foot-treadle X" is placed in the lower part of the post F and is connected by a rod 26 with the lower end of the bell-crank 25, and the arrangement is such that either by pressing upon the foot-treadle X", or by pulling upon the pull-rod X, the rear end of the lever V shall be depressed; thus elevating the front end of the lever V and lifting the pin D out of the socket E so as to permit the bolt I to be retracted. A screw W" is threaded through the front end of the lever V and, by turning said screw in the proper direction, its lower end will come into contact with the top-plate 7 of the lock-frame, and the front end of the lever V will be elevated so as to retain the pin D out of the socket E as long as desired, and thus rendering the operation of the pull-rod X or treadle X" unnecessary.

In Fig. 6 I have shown the trip-arm as formed of a single integral piece of approximately V-shape and as being returned to and retained in its normal position by gravity. The trip-arm may, however, if preferred, be formed as shown in Figs. 8, 10 and 13, in which event the trip-arm proper 27 is of straight form so as to extend transversely of the lock-frame and is pivoted intermediately of its ends, as at 28, to the lower-end of a hanger-plate 29, said hanger-plate being pivoted as at 30, upon the upper edge of the side-plate 12 of the lock-frame. In this instance, the hanger-plate 29 is normally held inward against the lock-frame by a spiral spring 31 surrounding a bolt 32, which projects horizontally outward from the side-plate 12, and which is interposed between the outer surface of the plate 12 and the head of the bolt; the stud 21 of the dog 20 acting against the inner surface of the lower end of the hanger-plate, to swing said plate and its trip-arm 27 outward, for the purpose above explained, and the outer end of the trip-arm being enlarged or weighted, as at $32^a$. Obviously any suitable form of presser-spring may be employed for returning the hanger-plate 27 to its normal position, and any form of spring acting upon the trip-arm S or 27 may be used in lieu of a weight or enlargement, as shown.

When the trip-arm S is employed, said arm is preferably formed, or provided in any suitable manner, with a cam $f''$, which is carried by the upper side of the inner arm of the trip and which is engaged by a pin $f$ projecting outward from the outer surface of the inner part of the bolt H. In its inner surface, the cam is formed with an irregular groove 33 of approximately rectangular contour, but having at its upper rear corner a rearwardly and downwardly inclined shoulder 34. The pin $f$ travels in the groove 33, as the bolt H is retracted, and the engagement of the pin with the shoulder 34 depresses the inner end of the trip-arm S, to permit the retraction of the bolt I, the cam-groove, as a whole, acting through the pin $f$ to hold the inner end of the trip-arm S depressed while the catch N is being raised by the coin, and to finally permit the inner end of the trip-arm to rise after the coin has passed into the passageway 14. Obviously it is the central projection 35 which is acted upon by the pin $f$ to hold the trip-arm depressed, and it is the vertical rear end portion of the groove which enables the trip-arm to rise; also it is obvious that this cam may be applied to the upper side of the trip-arm 27.

In Fig. 1, I have shown a suitable register R as mounted upon the upper end of the post F, and in Fig. 4 I have shown the bolt H as formed in its upper side with a notch $y$; the arrangement being such that, each time the bolt H is moved inward, its notch $y$ shall engage the usual actuating-arm of the register and impart one operative impulse to said register.

Having thus described my invention, what I claim as new therein, and desire to secure by Letters Patent, is—

1. A turnstile, comprising a vertical standard or support, for the gate proper, having at its upper end a septum or partition carrying on its upper surface a ratchet-gear ring, and a hub provided with radial arms or wings and revoluble upon the gate-standard and also at its lower end embracing said gate-standard, and a pawl pivoted within the hub and engaging the ratchet-ring of the gate-standard, substantially as set forth.

2. A turnstile, comprising a vertical standard or support, for the gate proper, having at its upper end a septum or partition carrying on its upper surface a ratchet-gear ring, a hub provided with radial arms or wings and revoluble upon the gate-standard, and also at its lower end embracing said gate-standard, a pawl pivoted within the hub and engaging the ratchet-ring, and a plurality of anti-friction balls interposed between the upper surface of the septum or partition and the lower part of the hub, substantially as set forth.

3. A turnstile, comprising a revoluble gate having a plurality of radial arms or wings, and a sliding locking-bolt, retracted by contact with the gate-arms, and a pivoted lever connected to a bell-crank lever, the latter carrying a pin, said pivoted lever being actuated voluntarily by an attendant and serving to engage the locking-bolt to prevent retraction thereof, and to release said bolt to permit the retraction of the same, substantially as set forth.

4. A turnstile, comprising a revoluble gate having a plurality of wings or arms, a sliding locking-bolt retracted by contact with the gate-arms, and a pivoted lever arranged to engage the locking-bolt to prevent retraction thereof, and also provided with a pull-rod operated by hand and serving to disengage the lever from the locking-bolt so as to permit the retraction of said bolt, substantially as set forth.

5. A turnstile, comprising a revoluble gate having a plurality of wings or arms, a sliding locking-bolt retracted by contact with the gate-arms, a pivoted lever arranged to engage the locking-bolt to prevent retraction thereof, and a foot-lever or treadle operatively connected to the lever and serving to move the latter out of engagement with the locking-bolt, so as to permit the retraction of said bolt, substantially as set forth.

6. A turnstile, comprising a revoluble gate having a plurality of arms or wings, a locking-mechanism for said gate comprising a pair of locking-bolts retracted by contact with the gate-arms, a lever engaging the primary bolt so as to prevent its retraction and disengagement from said bolt except by the weight of a coin, and the secondary bolt being also engaged by said lever which prevents the retraction of said bolt and which is disengaged from the bolt by contact with the coin, so as to permit retraction of said secondary bolt, substantially as set forth.

7. A turnstile, comprising a revoluble gate having a plurality of wings or arms, a locking-mechanism comprising a pair of locking-bolts retracted by contact with the gate-arms, the inner end of the secondary bolt extending across the path of movement of the inner end of the primary bolt, so as to be engaged by the latter, substantially as set forth.

8. A turnstile, comprising a revoluble gate having a plurality of wings or arms, and a locking-mechanism comprising two bolts retracted by contact with the gate-arms, and a tilting-lever engaging one of said bolts so as to prevent its retraction and also moved out of engagement with said bolt by the weight of a coin, so as to permit the retraction of the bolt, substantially as set forth.

9. A turnstile, comprising a revoluble gate having a plurality of arms or wings, and a locking-mechanism comprising a pair of spring pressed locking-bolts retracted by contact with the gate-arms, a lever engaging the primary bolt so as to prevent its retraction, and disengaged from said bolt by the weight of a coin, and a second lever engaging the secondary bolt and disengaged therefrom by contact with the coin, so as to permit retraction of the secondary bolt, substantially as set forth.

10. A turnstile, comprising a locking-mechanism consisting of a locking-bolt retracted by contact with the gate-arms, a tilting lever normally engaging said bolt so as to prevent retraction thereof, and moved out of engagement with the bolt by the weight of a coin, so as to permit retraction of the bolt, and a screw-rod having an inclined enlargement acting upon a lever which in turn acts upon the tilting lever so as to move the latter out of engagement with the bolt and thus permit retraction of the latter, substantially as set forth.

11. A turnstile, comprising a locking-mechanism composed of two locking-bolts retracted by engagement with the gate-arms, a lever normally engaging the secondary bolt so as to prevent retraction of the latter and moved out of engagement with said bolt by contact with a coin, so as to permit retraction of the bolt, and a screw acting by contact with the lever to move it out of engagement with the bolt, substantially as set forth.

ORION H. WILLIAMS.

Witnesses:
JNO. L. CONDRON,
TODD MASON.